United States Patent Office 3,576,642
Patented Apr. 27, 1971

3,576,642
NPN-COMPOSITION FOR RUMINANT ANIMALS
Andrew Cochran Currie, Largs, and Norman Macdonald Morss and Ian Thomson, West Kilbride, Scotland, assignors to Imperial Chemical Industries Limited, London, England
No Drawing. Filed May 13, 1968, Ser. No. 728,826
Claims priority, application Great Britain, May 19, 1967, 23,472/67
Int. Cl. A23k 1/00
U.S. Cl. 99—2
3 Claims

ABSTRACT OF THE DISCLOSURE

Non-protein nitrogenous compositions having a greatly reduced rate of solution, are produced by adding sodium carboxymethyl cellulose. Increased amounts of these may be used more safely and efficiently in animal foodstuffs.

---

This invention relates to improved non-protein nitrogenous compositions for use in feeds for animals and to the preparation of such compositions and to animal feeds comprising said compositions.

It is well known that ruminant animals have the ability of using non-protein nitrogenous (hereinafter referred to as NPN) compounds in small amounts to replace part of their requirements for dietary protein. If too high a proportion of the protein of animal foodstuff is replaced by NPN material such as urea, the animal's health may be seriously impaired and in some cases the animal may die. This is because the NPN compounds dissolve so rapidly in the rumen fluids that they cannot be used efficiently for protein synthesis and are therefore absorbed in toxic quantities by the animal. The use of increased quantities of NPN compounds in ruminant animal feeds is facilitated by reducing the rate of solution of the NPN compound. It has been proposed to effect this by chemically altering the NPN compound but a more promising method involves coating the NPN compound in particulate form with a water-soluble polymeric material. The coating materials hitherto proposed have either been insufficiently effective in reducing the rate of solution of NPN compounds to a desirable extent or they have been too effective, giving NPN compounds which only released NPN compound in the rumen fluid at an undesirably slow rate at which it is also inefficiently used by the animal.

We have now discovered that if the NPN compound is admixed with a water-soluble salt of carboxymethyl cellulose its rate of solution can be substantially reduced and NPN compositions can be prepared which may be used in the feeds of animals to give efficient utilisation of the NPN material without harmful effect on the animal.

Thus in accordance with this invention a NPN composition for use in an animal foodstuff comprises a NPN compound in admixture with a water-soluble salt of carboxymethyl cellulose. The invention also includes a method of feeding an animal wherein the animal is fed with a NPN composition of the invention.

The NPN compound is preferably urea, but other NPN compounds which may advantageously be used include biuret and ammonium salts, such as ammonium sulphate or ammonium phosphate.

The water-soluble salt of carboxymethyl cellulose is advantageously sodium carboxymethyl celluose. Preferably the sodium carboxymethyl cellulose is a grade having a degree of substitution of 0.4 to 1.2 sodium carboxymethyl groups per anhydroglucose unit and such that a 1% aqueous solution at 20° C. has a viscosity of 2000 to 5000 centipoises (as measured by A.S.T.M. Method D1439–64T). The water-soluble salt of carboxymethyl cellulose may, if desired, be treated with or mixed with a substance, for example citric acid, to reduce its water solubility.

Conveniently, the NPN composition should comprise water-soluble salts of carboxymethyl cellulose and NPN compound in the weight ratio 2.5:97.5 to 15:85. Preferably the ratio is 5:95 to 10:90.

A final animal feed may safely contain up to 7% by weight of the NPN composition but a preferred amount is in the range 2 to 5% by weight. A high protein supplement for addition to basal cereal diets to give balanced rations might contain up to 5% of the NPN composition. The feed may contain any conventional foodstuff ingredient, for example carbohydrate materials such as grain or flavouring material. Food ingredients such as grain meal and spice may also be incorporated into the NPN compositions.

The NPN compositions of the invention may be prepared in particulate form wherein particles of NPN compound are coated with water-soluble salt of carboxymethyl cellulose but preferably it is mixed into animal feed in the form of aggregated granules or pellets.

The rate of NPN compound solution is dependent to a great extent on the size of the granules of the NPN composition. Granules or pellets having a minimum dimension of 2 to 10 millimetres have been found to give a desirable rate of NPN compound release.

The granules or pellets may, if desired, be coated with a waterproof polymeric material, for example polyvinyl chloride or copolymer thereof with polyvinyl acetate, to reduce taste or to delay dissolution for an initial period after the granules or pellets are immersed in rumen fluid.

In one process of preparation particles of NPN compound are intimately mixed with finely divided water-soluble salt of carboxymethyl cellulose and the dry mixture is pressed into aggregates by pelletting or rolling and subsequenty breaking the compressed mass.

In another process particles of NPN compound are coated with a solution of water-soluble salt of carboxymethyl cellulose. The coated particles may be dried and, if desired, subsequently aggregated by pressing or by means of a binding agent, but preferably the coated particles are aggregated into granules before drying, the water-soluble salt of cellulose ether being a sufficiently effective binding agent for this purpose.

In a further preferred process of preparation the NPN compound is intimately mixed with water-soluble salt of carboxymethyl cellulose and water to form a paste which may be shaped into any desired size by, for example, extruding through a die and cutting into lengths or rolling into a sheet and dividing the sheet, the water being dried off either before or after cutting or dividing the material. The amount of water in the paste is preferably 0.5 to 4.0 parts by weight to each part of water-soluble salt of carboxymethyl cellulose. In one advantageous form of this method the water is supplied as molasses which imparts a desirable colour and taste to the NPN composition.

In one specially advantageous method of preparation an aqueous solution of a NPN compound, for example urea, is used directly as produced in its preparation process without cooling or drying, the water-soluble salt of carboxymethyl cellulose being added to the hot solution to form the paste.

If it is desired to coat granules or pellets of the NPN composition with a waterproof polymeric material this may conveniently be effected by spraying a solution of the polymeric material over an agitated quantity of the granules or pellets and subsequently removing the solvent, for example by a stream of air.

The invention is further illustrated by the following examples wherein all parts and percentages are by weight.

EXAMPLE 1

The urea used in this example was urea having the following sieve analysis:

Percent passing BSS:
- 25—98
- 36—83
- 44—64
- 60—21

The sodium carboxymethyl cellulose had a degree of substitution of 0.7 and a viscosity such that a 1% aqueous solution had a viscosity of 3,500 centipoises at 20° C.

1 part of sodium carboxymethyl cellulose was mixed with 19 parts of urea and 2 parts of water were added and mixed into a paste which was formed into pellets by extruding through a 12.5 mm. diameter die and cutting into 6 mm. lengths. The pellets were air dried for 24 hours at 20° C. When immersed in water at 39° C. (normal rumen temperature) the pellets released 50% of the urea in 2½ hours.

A highly compressed pellet of the same dimensions formed by pressing pure urea at 50 tons pressure dissolved completely when immersed in water at 39° C. for 9 minutes.

EXAMPLE 2

1 part sodium carboxymethyl cellulose powder as used in Example 1 was intimately mixed with 9 parts of urea as used in Example 1 and 1 part of water was added and mixed to form a paste. The paste was extruded through a 12.5 mm. diameter die and cut into 12.5 mm. lengths which were dried for 72 hours at 25° C. When immersed in water at 39° C. these pellets released 50% of the urea in 3 hours.

EXAMPLE 3

The procedure described in Example 1 was repeated but in this example the paste was extruded through a 4.75 mm. diameter die and cut into 6 mm. lengths which were dried in air at 40° C. for 12 hours. When immersed in water at 39° C. these pellets released 50% of the urea in 40 minutes.

EXAMPLE 4

9 parts of urea as used in Example 1, 10 parts of barley meal, 1 part of sodium carboxymethyl cellulose as used in Example 1 and 2.5 parts of water were mixed to form a paste and formed into pellets as described in Example 1. When immersed in water at 39° C. the dried pellets released 50% of the urea in 1 hour.

EXAMPLE 5

18 parts of urea as used in Example 1, 1 part of sodium carboxymethyl cellulose as used in Example 1, 1 part of water and 1 part of a mixture containing 20% of sodium sulphate, 40% calcium phosphate, 20% of a spice commercially available as "Avonmouth" spice and 20% cobalt sulphate, were mixed into a paste and formed into pellets as described in Example 1. When immersed in water at 39° C. the pellets released 50% of the urea in 80 minutes.

EXAMPLE 6

46.5 parts of urea as used in Example 1, 2.5 parts of sodium carboxymethyl cellulose as used in Example 1, 1 part of "Avonmouth" spice as used in Example 5 and 1.25 parts of water were mixed to a paste and formed into pellets as described in Example 1. When immersed in water at 39° C. the pellets released 50% of the urea in 100 minutes.

EXAMPLE 7

1 part of sodium carboxymethyl cellulose as used in Example 1 was mixed with a hot solution containing 12 parts of urea and 3.5 parts of water at 100–120° C., obtained from a urea preparation process, to form a paste which was extruded through a 12.5 mm. diameter die and cut into 6 mm. lengths which were dried in air at 20° C. for 24 hours. The resulting pellets released 50% of the urea in 2½ hours when immersed in water at 39° C.

EXAMPLE 8

The procedure of Example 1 was repeated except that 2 parts of molasses were used in place of 2 parts of water. When immersed in water at 39° C. the pellets released 50% of the urea in 90 minutes.

EXAMPLE 9

35 parts of urea as used in Example 1, 1 part of sodium carboxymethyl cellulose as used in Example 1 and 2.5 parts of water were mixed and formed into pellets as described in Example 1. When immersed in water at 39° C. the pellets released 50% of the urea in 2 hours.

EXAMPLE 10

1 part of sodium carboxymethyl cellulose having a degree of substitution of 0.7 and having a viscosity such that a 1% aqueous solution at 20° C. had a viscosity of 50 centipoises, was mixed with 9 parts of urea as used in Example 1 and 1 part of water to form a paste which was shaped into pellets by extrusion through a 12.5 mm. diameter die and cutting into 6 mm. lengths. The pellets were dried at 25° C. for 48 hours. When immersed in water at 39° C. the pellets released 50% of the urea in 1 hour.

EXAMPLE 11

1 part of sodium carboxymethyl cellulose as used in Example 10 was mixed with 9 parts of urea as used in Example 1, 1 part of water and 0.33 part of citric acid to form a paste which was shaped into pellets as described in Example 10. When immersed in water at 39° C. the pellets released 50% of the urea in 80 minutes.

EXAMPLE 12

1 part of sodium carboxymethyl cellulose having a degree of substitution of 1.2 and a viscosity such that a 1% aqueous solution at 20° C. had a viscosity of 950 centipoises, was mixed with 19 parts of urea as used in Example 1 and 0.5 part of water to form a paste which was formed into pellets as described in Example 10. When immersed in water at 39° C. the pellets released 50% of the urea in 50 minutes.

EXAMPLE 13

1 part of sodium carboxymethyl cellulose having a degree of substitution of 0.4 and a viscosity such that a 1% aqueous soltuion at 20° C. had a viscosity of 3,500 centipoises, was mixed with 19 parts of urea as used in Example 1 and 1 part of water to form a paste which was shaped into pellets as described in Example 10. When immersed in water at 39° C. the pellets released 50% of the urea in 1 hour.

EXAMPLE 14

6 parts of urea as used in Example 1, 1 part of sodium carboxymethyl cellulose as used in Example 1, 15 parts of sodium chloride and 3 parts of molasses were mixed, pressed into a wooden mould and dried in air at room temperature to form a block, 7.6 cm. x 5 cm. x 22 cm. When left to weather in an exposed site 50% of the urea was dissolved from the block after 4 cm. rainfall.

An identical block was prepared except that the sodium carboxymethyl cellulose was omitted. When left to weather in an exposed site 50% of the urea was dissolved after 2.6 cm. rainfall.

EXAMPLE 15

The procedure of Example 1 was repeated except that biuret was used in place of urea. When immersed in water at 39° C. the release of biuret was much slower than the release of biuret from similar shaped pellets of highly compressed biuret.

EXAMPLE 16

The procedure of Example 1 was repeated except that ammonium phosphate was used in place of urea. When immersed in water at 39° C. the pellets released 50% of the ammonium phosphate in 1 hour.

EXAMPLE 17

The procedure of Example 1 was repeated except that ammonium sulphate was used in place of urea. When immersed in water at 39° C. the pellets released 50% of the ammonium sulphate in 1 hour.

EXAMPLE 18

1 parts of sodium carboxymethyl cellulose powder as used in Example 1 was mixed with 19 parts of urea as used in Example 1 and formed into pellets in a press by first evacuating the dry mixture to a pressure of 10 mm. mercury and pressing the mixture at 50 tons/sq. in. to form cylindrical pellets 1.5 mm. diameter and 10 mm. long. When immersed in water at 39° C. the pellet released 50% of its urea in 2 hours.

EXAMPLE 19

1 part of sodium carboxymethyl cellulose as used in Example 1 was intimately mixed with 19 parts of urea as used in Example 1, and 2 parts of water were added and mixed to form a paste. The paste was extruded through a 3 mm. diameter die and cut into 3 mm. lengths which were dried at 60° C. for 15 hours. When 2 g. of these pellets were immersed in water at 39° C. they released 50% of the urea in 17 minutes.

EXAMPLE 20

Pellets prepared as in Example 19 were tumbled in a drum and sprayed with a 15% solution of a copolymer of polyvinyl chloride (87 parts) and polyvinyl acetate (13 parts) in 80/10/10 acetone/toluene/methyl isobutyl ketone to provide a 2% copolymer coating on the pellets. The pellets were dried by a stream of air while still tumbling. When 2 g. of the coated pellets were immersed in water at 39° C. they released 50% of the urea in 25 minutes.

What we claim is:

1. A NPN composition for animal foodstuff comprising a NPN compound selected from the group consisting of urea, biuret, ammonium sulphate and ammonium phosphate in admixture with sodium carboxymethyl cellulose wherein the sodium carboxymethyl cellulose is a grade having a degree of substitution of 0.4 to 1.2 sodium carboxymethyl groups per anhydroglucose unit and wherein the sodium carboxymethyl cellulose is such that a 1% aqueous solution at 20° C. has a viscosity of 2,000 to 5,000 centipoises.

2. A composition as claimed in claim 1 comprising sodium carboxymethyl cellulose and NPN compound in the weight ratio 2.5:97.5 to 15:85.

3. A composition as claimed in claim 1 comprising particles of NPN compound coated sodium carboxymethyl cellulose, said coated particles having a minimum dimension of 2 to 10 millimetres.

References Cited

UNITED STATES PATENTS

| | | | |
|---|---|---|---|
| 2,293,845 | 8/1942 | Millar | 99—2 |
| 2,410,417 | 11/1946 | Andersen | 167—81 |
| 2,480,103 | 8/1949 | Fux | 99—11 |
| 2,560,830 | 7/1951 | Turner | 99—2 |
| 2,569,282 | 9/1951 | Block | 99—8X |
| 2,755,187 | 7/1956 | Belasco | 99—2 |
| 2,808,332 | 10/1957 | Anderson et al. | 99—2X |
| 2,861,886 | 11/1958 | Colby et al. | 99—1 |
| 3,224,883 | 12/1965 | Pader et al. | 99—139 |
| 3,416,928 | 12/1968 | Freese | 99—2 |
| 3,093,488 | 6/1963 | Graham et al. | 99—129X |
| 3,326,665 | 6/1967 | Schafer et al. | 71—28 |

FOREIGN PATENTS 759,296    1956    Great Britain.

OTHER REFERENCES

J. Am. Science 25, pp. 73–77 (1966), Shaadt, Johnson et al.

McLaren et al.: J. of Animal Science, vol. 18 (1959), pp. 1319–1326.

NORMAN YUDKOFF, Primary Examiner

F. E. DRUMMOND, Assistant Examiner

U.S. Cl. X.R.

99—6, 129; 71—28